United States Patent [19]

Kotake et al.

[11] Patent Number: 4,542,423
[45] Date of Patent: Sep. 17, 1985

[54] ROTATION CONTROL DEVICE FOR INFORMATION RECORDING DISC

[75] Inventors: Eiichi Kotake; Ken Enami, both of Fujieda; Kinzo Wada, Yokohama, all of Japan

[73] Assignee: Victor Company of Japan, Yokohama, Japan

[21] Appl. No.: 541,216

[22] Filed: Oct. 12, 1983

[30] Foreign Application Priority Data

Oct. 15, 1982 [JP] Japan ................................. 57-181046

[51] Int. Cl.[4] ........................................... G11B 19/24
[52] U.S. Cl. ........................................... 360/73
[58] Field of Search ................ 360/73; 358/321, 322, 358/338; 369/47, 50, 239, 241

[56] References Cited

U.S. PATENT DOCUMENTS

| | | | |
|---|---|---|---|
| 3,174,090 | 3/1965 | Hall | 360/73 |
| 3,503,058 | 3/1970 | Ault et al. | 360/73 |
| 3,526,726 | 9/1970 | Corbett et al. | 360/73 |
| 4,003,090 | 1/1977 | Beck | 360/70 |
| 4,338,683 | 7/1982 | Furukawa et al. | 369/50 |

Primary Examiner—George G. Stellar
Attorney, Agent, or Firm—Jordan and Hamburg

[57] ABSTRACT

A rotation control device causes a disc on which information and sync signals are recorded to rotate at a predetermined speed. The control device includes a generator for generating a signal whose frequency is identical with that of a rotation signal which will be output from a frequency generator while the disc rotates at the predetermined speed. A control loop is defined which compares a phase of an output of the signal generator and a rotation signal output from the frequency generator, thereby controlling the drive of the motor.

6 Claims, 8 Drawing Figures

ROTATION CONTROL DEVICE FOR INFORMATION RECORDING DISC

BACKGROUND OF THE INVENTION

The present invention relates to a rotation control device for an information recorded disc which is applicable to a video disc player or the like. The player rotates a disc with recorded information and sync signals at a predetermined speed.

Today, such discs are available for high density recording and playback of information signals having in a wide frequency range. When used for recording and playback purpose, the discs simplify a drive mechanism therefor compared to other forms of information recording media, and thereby renders the construction of a playback apparatus simple and economical. Various kinds of recording/playback apparatuses have been put to practical use utilizing such features of discs.

The primary requisite for a playback apparatus for discs is that it is capable of controlling the rotation of a disc to a speed and a phase which are preselected for faithful reproduction of information signals out of the disc.

A prior art disc rotation control device generally comprises a motor for driving a disc which is fixed in place on a turntable by a clamp, a playback or read element for reading an information signal out of the disc, a signal processing circuit for processing the information signal, a phase comparator for generating a first difference signal by comparing a sync signal extracted from the disc by the signal processor and a reference signal generated by a reference signal generator, a frequency generator for generating a signal whose frequency corresponds to a motor rotation speed, a frequency-to-voltage (FV) converter for transforming a signal output from the frequency generator into a voltage, an operation circuit for generating a second difference signal by comparing a voltage output from the FV converter with a reference voltage and adding the second difference signal to the first, a phase compensator for compensating the phase of a signal output from the operation circuit, and a motor drive for driving the motor by applying thereto a drive current which corresponds to the phase compensated signal.

The prior art control device described above includes a first control loop for speed control and a second control loop for phase synchronization between a sync signal recorded in a disc and a reference signal output from the reference signal generator. The first control loop is completed by the motor, frequency generator, converter, operator, phase compensator, motor driver which are connected in this order. The second control loop, on the other hand, is completed by the motor, read element, signal processor, phase comparator, operator, phase compensator, and motor drive which are also connected in this order. At a start-up of the motor, a speed control is performed by the first control loop such that the rotation of the disc is quickly accelerated to a predetermined speed. This is followed by a phase control performed by the second control loop so that the rotation phase of the motor is locked to the phase of the reference signal which is generated by the reference signal generator. The two sequential controls allow a disc to rotate at a specific speed which correctly reproduces an information signal out of the disc.

In the start-up stage of the motor operation, the rotation speed progressively increases from zero and, therefore, the relative reading velocity of the disc and read element progressively increases from zero. For this reason, a demodulator which is installed in the signal processor to demodulate information signals read out of a disc does not produce any information signal or sync signal unless the disc rotation is accelerated substantially to a predetermined speed. This means that in this operation, the speed control by the first control loop occurs but not by the second control loop.

The reason why the demodulator produces no information signal or sync signal except for a predetermined disc rotation speed is as follows. While signals recorded in discs are FM waves or the like, the demodulator for demodulating them is unable to produce demodulated outputs except for signals which fall in a specific frequency range. In other words, unless the disc rotation speed becomes close to predetermined one, the frequencies of FM waves corresponding to information and sync signals fall out of the demodulator's operational frequency range.

As soon as the disc rotation is controlled by the first control loop substantially to the predetermined speed, the signal processor starts producing demodulated information and sync signals. The phase comparator compares the phase of the sync signal output from the signal processor with that of the reference signal output from the reference signal generator, delivering a difference signal to the operation circuit or operator. Where the frequency difference between the two signals input to the phase comparator is larger than one half the cut-off frequency of the second control loop, the phase comparator produces an alternating difference signal whose repetition frequency is the frequency difference between the two signals. However, due to a relatively low cut-off frequency of the second control loop, the system fails to respond to the difference voltage so that a zero or non-controlled state occurs preventing the phase from being locked for the predetermined speed.

The problem discussed above will not arise insofar as the velocity control performed by the first control loop is accurate enough to drive a disc exactly at a predetermined speed. Nevertheless, the accuracy of motor speed control by the first control loop depends upon the accuracy and stability of the FV converter which is included in the first control loop. The operation point of the FV converter is generally dependent upon a time constant determined by a resistor and a capacitor and, therefore, the accuracy of the FV converter is affected by the accuracy of the resistor and capacitor.

The accuracy and stability of resistors and capacitors cannot be increased beyond a certain limit. Hence, where the frequency of the signal output from the reference signal generator is relatively high, difficulty has been experienced in enhancing the accuracy of speed control by the first control loop to such a degree that it is confined to within the frequency difference which allows the second control loop to perform pull-in, that is, within a frequency difference which is not smaller than one half the cut-off frequency of the second control loop.

SUMMARY OF THE INVENTION

It is an object of the present invention to provide an improved rotation control device for an information recording disc which eliminates the drawback inherent in the prior art device and allows a disc to rotate at a predetermined speed and in a predetermined phase.

It is another object of the present invention to provide a generally improved rotation control device for an information recording disc.

A rotation control device for rotating a disc on which an information signal and a sync signal are recorded of the present invention comprises a motor for causing the disc into rotation, a rotation signal generator for generating a rotation signal having a frequency which is proportional to a rotation speed of the motor, a first reference signal generator for generating a first reference signal which is identical in frequency with the sync signal, a first phase comparator for generating a first difference signal responsive to a phase difference between the sync signal read out of the disc and the first reference signal, a second reference signal generator for generating a second reference signal while the motor rotates the disc for reproducing the sync signal having the frequency out of the disc, the second reference signal being identical in frequency with the rotation signal output from the rotation signal generator, a second phase comparator for generating a second difference signal responsive to a phase difference between the rotation signal output from the rotation signal generator and the second reference signal, an operator for performing a predetermined operation with the first and second difference signals to generate a signal as a result of the operation, a phase compensator for compensating a phase of the signal output from the operator to generate a phase compensated signal, and a motor drive for driving the motor in response to the phase compensated signal.

In accordance with the present invention, a rotation control device causes a disc on which information and sync signals are recorded to rotate at a predetermined velocity. The control device includes a generator for generating a signal whose frequency is identical with that of a rotation signal which will be output from a frequency generator while the disc rotates at the predetermined speed. A control loop is defined which compares a phase of an output of the signal generator and a rotation signal output from the frequency generator, thereby controlling the drive of the motor.

The above and other objects, features and advantages of the present invention will become apparent from the following detailed description taken with the accompanying drawings.

DESCRIPTION OF THE PREFERRED EMBODIMENTS

While the rotation control device for an information recording disc of the present invention is susceptible of numerous physical embodiments, depending upon the environment and requirements of use, substantial numbers of the herein shown and described embodiments have been made, tested and used, and all have performed in an eminently satisfactory manner.

Figure 1:
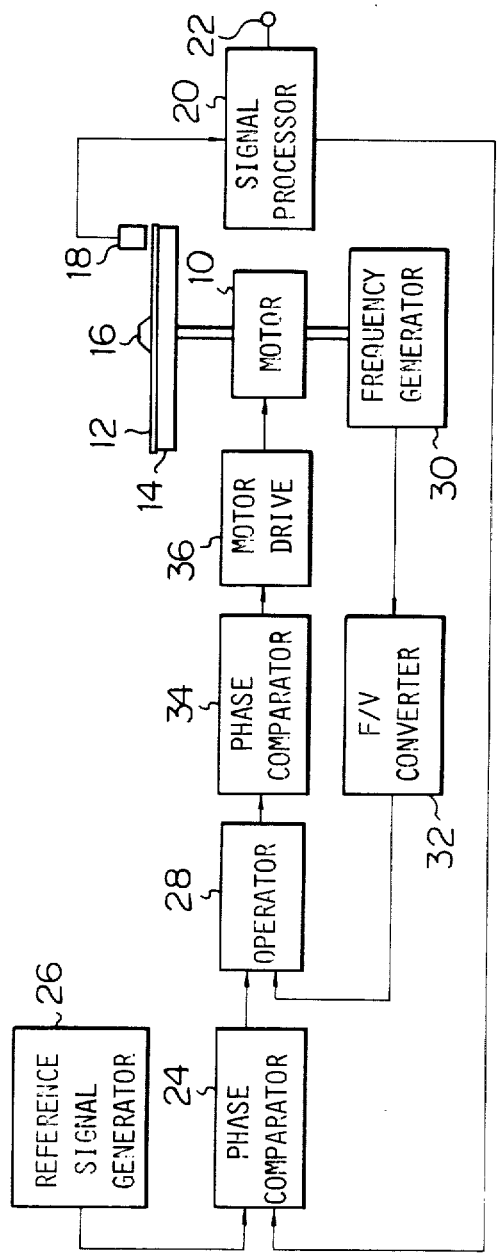
FIG. 1 is a block diagram of a prior art rotation control apparatus for an information recording disc.

To facilitate understanding of the present invention, a brief reference will be made to a prior art disc rotation control device, illustrated in FIG. 1. In FIG. 1, a motor 10 rotates a disc 12 which is fixed in place on a turntable 14 by a clamp 16. While the motor 10 rotates at a predetermined speed, a read or playback element 18 reads an information signal out of the disc 12 which is rotating integrally with the turntable 14. The information signal is fed to a signal processing circuit 20 an output of which is supplied to an output terminal 22. The signal processing circuit or processor 20 extracts a sync signal which is recorded in the disc 16 together with the information signal. The sync signal is delivered to a phase comparator 24 to be compared thereby with a reference signal, which is also supplied to the phase comparator 24 by a reference signal generator 26. The comparator 24 delivers a difference signal to an operation circuit 28.

Meanwhile, a frequency generator 30 generates a signal whose frequency represents a rotation speed of the motor 10. The frequency generator output is fed to a frequency-to-voltage (FV) converter 32 an output of which, a voltage, is fed to the operation circuit or operator 28. The operator 28 compares the voltage output from the FV converter 32 with a predetermined reference voltage to generate a difference signal and adds the difference signal to the difference signal which is output from the phase comparator 24 as previously described. The operator 28 sends its sum output to a phase compensation circuit 34. The phase compensated output of the phase compensation circuit or compensator 34 is supplied to a motor drive 36 which is adapted to apply a drive current proportional to the input to the motor 10, thereby causing the motor 10 into rotation.

The problem encountered with such a prior art rotation control device is that, as previously stated, the FV converter 32 installed in the first control loop cannot be furnished with a satisfactory accuracy and, therefore, the speed control by the first control loop fails to set up a rotation speed which satisfies the pull-in condition of the second control loop.

Figure 2:
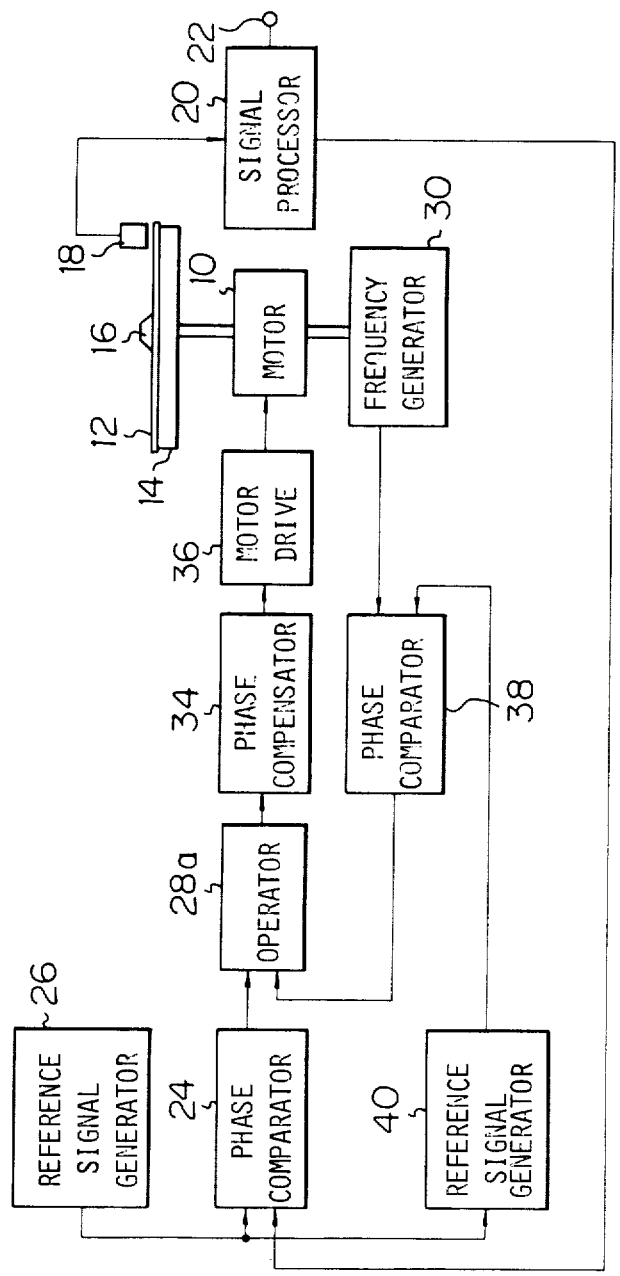
FIGS. 2–4 are block diagrams of various embodiments of the present invention.
Figure 3:
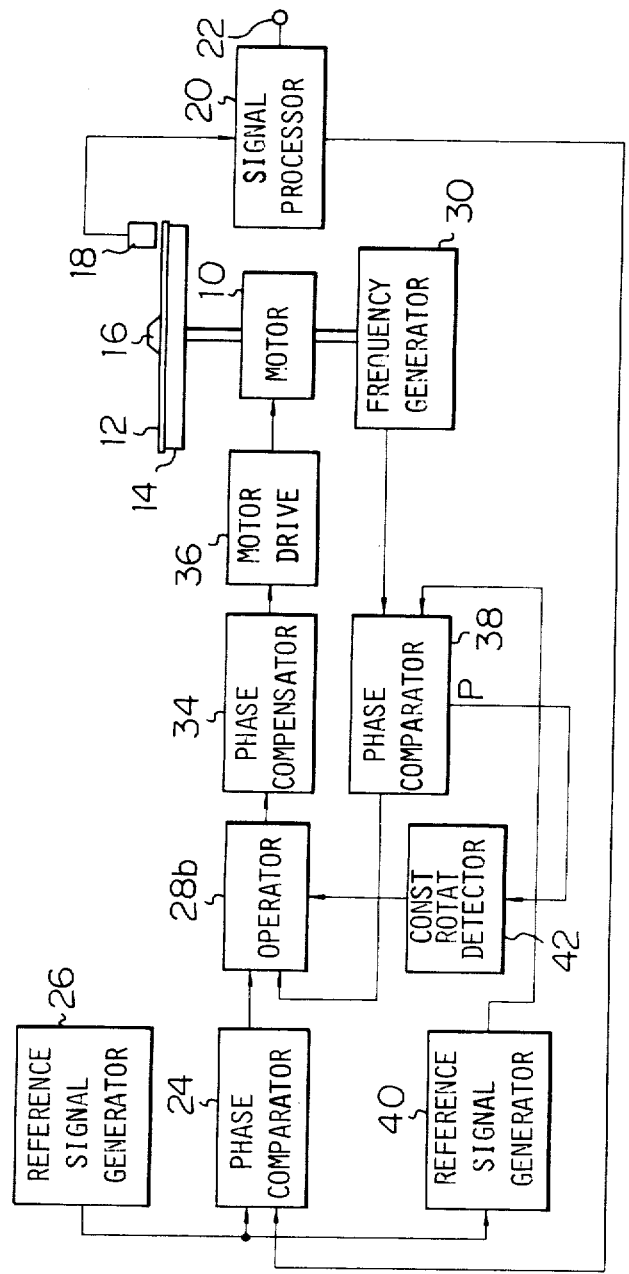
Figure 4:
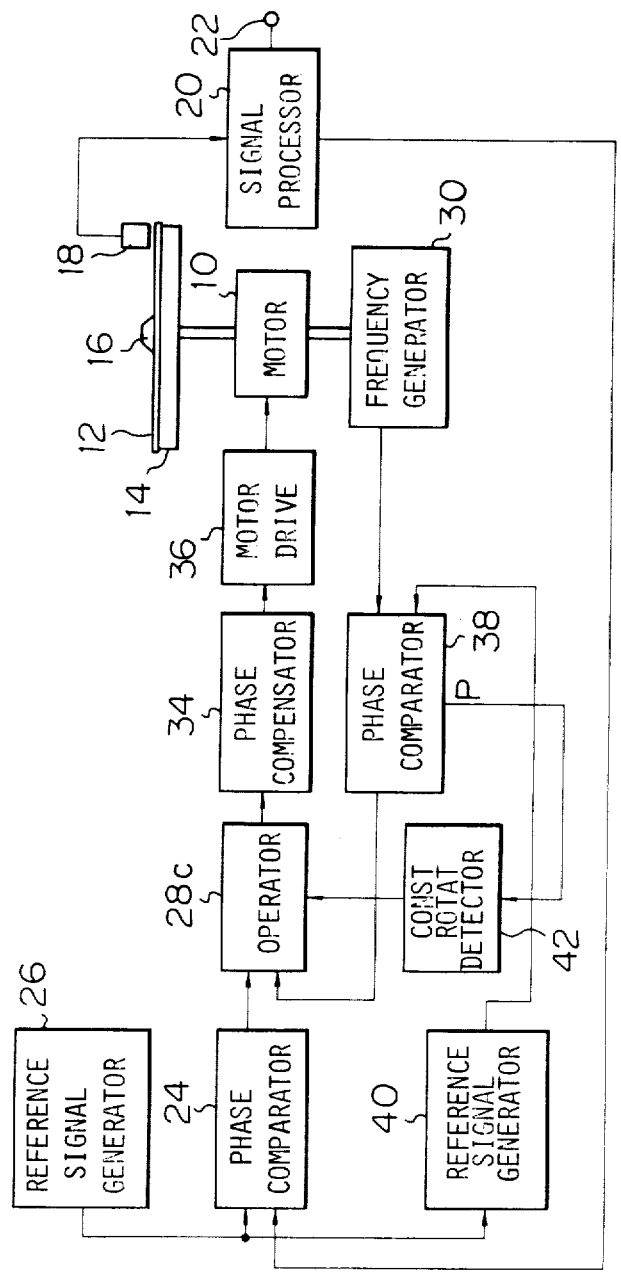

Referring to FIGS. 2–4, various embodiments of the present invention are shown which overcome the problem encountered with the prior art device. In FIGS. 2–4, structural elements common to those of the prior art device shown in FIG. 1 are designated by the same reference numerals for simplicity.

Figure 5:
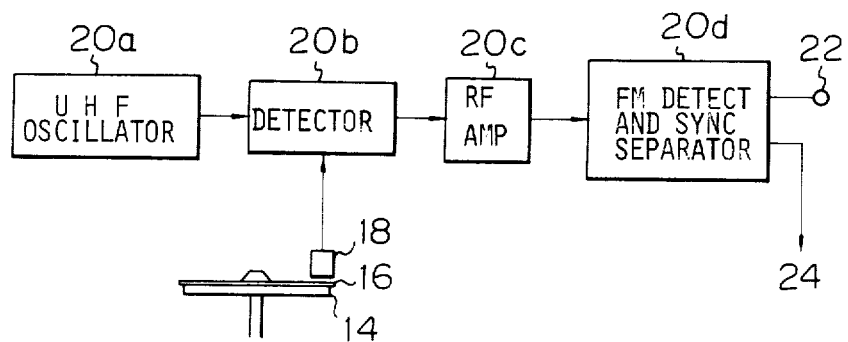
FIGS. 5–8 are diagrams of a playback signal processor, an operation circuit and a signal detector, which are individually applicable to the constructions shown in FIGS. 2–4.

Each of the embodiments shown in FIGS. 2–4 comprises a second phase comparator 38 (e.g. TOSHIBA TA-5081), a second reference signal generator 40 for generating a second reference signal, and a constant rotation detector 42 (FIGS. 3 and 4 only), in addition to the motor 10, turntable 14, clamp 16, read element 18, signal processor 20, first phase comparator 24, first reference signal generator 26, operator 28a, 28b or 28c, frequency generator 30, phase compensator 34, and motor drive 36. The signal processor 20 shown in any one of FIGS. 1–4 may comprise, as shown in FIG. 5, a UHF oscillator 20a, a detector 20b, an RF amplifier 20c, an FM detector and sync separator 20d (e.g. MITSUBISHI IC M51680P), and the like.

The first reference signal generator 26 generates a first reference signal whose frequency fs is identical with the frequency fs of the sync signal stored in the disc 16. The second reference signal generator 40, on the other hand, generates a second reference signal having a frequency fr identical with the frequency fr of a rotation signal which will be output from the frequency generator 30 when the motor 10 is rotating at such a speed that the sync signal of the frequency fs is reproduced.

In the second reference signal generator 40 in the embodiments of FIGS. 2-4, a divider is used to divide the frequency of the signal output from the first reference signal generator 26 by "N" to provide the second signal having the frequency fr. Stated another way, where the frequency of the first reference signal is equal to the product of the frequency of the second reference signal and "N", fs=N·fr, the second reference signal is attainable by use of a divider for dividing the frequency of the first reference signal by "N".

In each of the embodiments shown in FIGS. 2-4, the first loop is completed by the motor 10, frequency generator 30, second phase comparator 38, operator 28a, 28b or 28c, phase compensator 34, and motor drive 36, which are connected together in this order. The control performed by the first loop is such that a second difference signal output from the second phase comparator 38 as a result of comparison between the outputs of the second reference signal generator 40 and frequency generator 30 converges to zero. The second loop, on the other hand, is completed by the first phase comparator 24 adapted to compare the phase of the reference signal from the first reference signal generator 26 and that of the sync signal from the signal processor 20, operator 28a, 28b or 28c, phase compensator 34, motor drive 36, motor 10, turntable 14 and disc 12, read element 18, and signal processor 20, which are connected together in this order. The rotation speed of the motor 10 which is driven under the control of the first loop is such that it readily satisfies the pull-in condition for the control by the second loop. With such a construction, the rotation control device in accordance with the present invention eliminates the previously discussed problem with ease.

Figure 6:
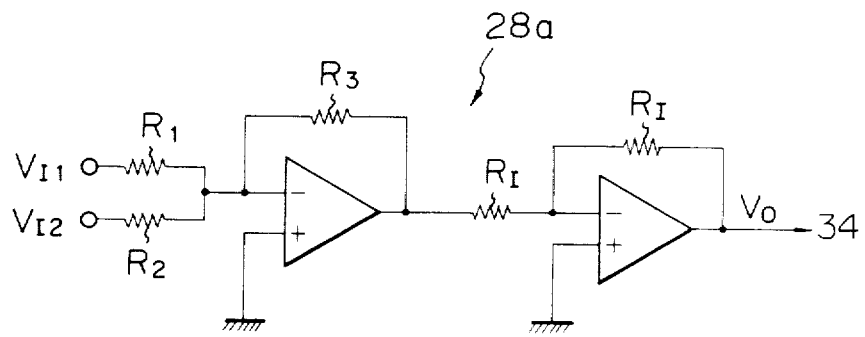

The operator 28a included in the embodiment of FIG. 2 may be constructed as shown in FIG. 6. In the construction of FIG. 6, a first difference signal $V_{f1}$ output from the first phase comparator 24 and a second difference signal $V_{f2}$ output from the second phase comparator 38 are combined by a predetermined ratio. The output of the operator 28a is, therefore, a voltage $$V_0 \left( = \frac{R_3}{R_1} V_{f1} + \frac{R_3}{R_2} V_{f2} \right).$$

As described above, the signal frequencies subjected to phase comparison in the first and second control loops are different from each other. Therefore, the result of control performed by the first control loop effects the control operation of the second control loop during constant rotation of the motor, resulting in a phase difference between two inputs to the first phase comparator 24 of the second control loop. In light of this, it will be understood that the ratio between the combined inputs to the operator 28a needs be one which maintains the amount of phase difference negligible. The embodiments shown in FIGS. 3 and 4 represent implementations for overcoming such a problem related to phase difference.

Figure 7:
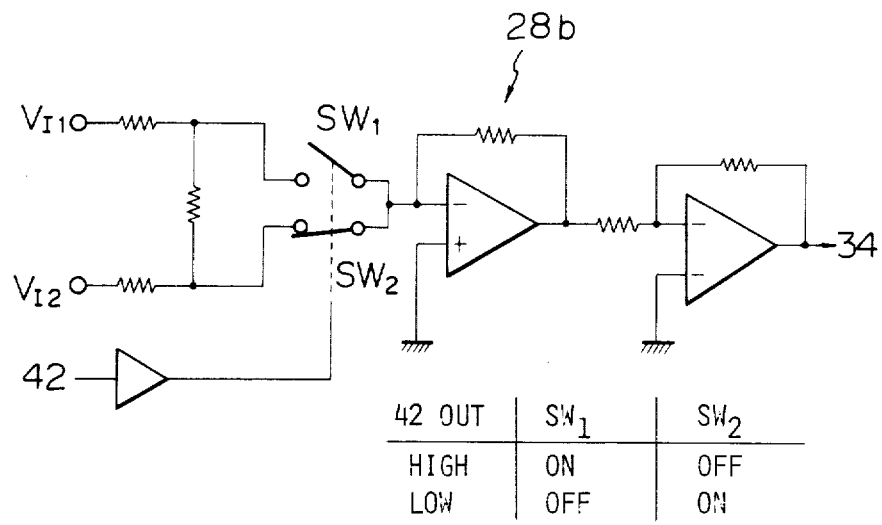

The control device shown in FIG. 3 changes the ratio between the combined first and second difference signals $V_{f1}$ and $V_{f2}$ from a start-up to a constant speed rotation of the motor, by means of the operator 28b which may have the construction shown in FIG. 7, where SW₁ and SW₂ operate in accordance with the table in FIG. 7 to select a predetermined ratio of $V_{f1}$ and $V_{f2}$ depending on the signal from a constant rotation detector 42. In the embodiment shown in FIG. 4, on the other hand, the operator 28c is constructed to produce only the second difference signal during a start-up of the motor and only the first difference signal during a constant speed rotation.

In the control device shown in FIGS. 3 or 4, the signal used for switching the operation mode of the operator 28b or 28c as described above is prepared, for example, by delivering to the constant rotation detector 42 a signal output from the second phase comparator 38 and corresponding to a phase difference, e.g. a pulse signal whose duty corresponds to a phase difference. The constant rotation detector 42 may be constructed to generate a signal which selectively takes on one of two levels depending upon whether or not the phase difference lies in a predetermined range.

Figure 8:
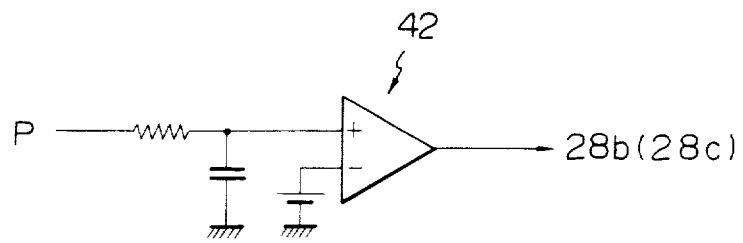

An example of such a construction is illustrated in FIG. 8.

In summary, a disc rotation control device of the present invention includes a first control loop which during a start-up of a motor controls the rotation of the motor in response to a second phase difference signal which is a difference in phase between a signal output from a frequency generator adapted to generate a signal of a frequency proportional to the motor rotation, and a second reference signal whose frequency fr is identical with the frequency fr of a signal which will be output from the frequency generator when the motor is rotating at a regular speed. It will thus be seen that the device performs the control with accuracy which stabilizes the pull-in of a second control loop which operates in response to a first phase difference signal given by the comparison between a sync signal read out of a disc and a first reference signal. This effectively frees the device from the drawback inherent in the prior art device.

Another outstanding advantage of the present invention is that the phase difference between the first reference signal and the reproduced sync signal can be reduced in the course of constant rotation of the motor. For this purpose, the operator may be constructed such that the first and second phase difference signals may be combined by a predetermined proportion, such that the ratio between the combined signals is varied from a start-up to a constant rotation of the motor, or such that the second and first signals are used for the start-up and constant rotation, respectively.

Various modifications will become possible for those skilled in the art after receiving the teachings of the present disclosure without departing from the scope thereof.

What is claimed is:

1. A rotation control device for rotating a disc on which an information signal and a sync signal are recorded, comprising:
   a motor for causing the disc into rotation;
   rotation signal generator means for generating a rotation signal having a frequency which is proportional to a rotation speed of said motor;
   first reference signal generator means for generating a first reference signal which is identical in frequency with the sync signal;
   first phase comparator means for generating a first difference signal responsive to a phase difference between the sync signal read out of the disc and the first reference signal;
   second reference signal generator means for generating a second reference signal while the motor rotates the disc for reproducing the sync signal having said frequency out of the disc, said second reference signal being identical in frequency with the rotation signal output from the rotation signal generator means;

second phase comparator means for generating a second difference signal responsive to a phase difference between the rotation signal output from the rotation signal generator means and the second reference signal;

operator means for performing a predetermined operation with the first and second difference signals to generate a signal as a result of the operation;

phase compensator means for compensating a phase of the signal output from said operator means to generate a phase compensated signal; and motor drive means for driving the motor in response to the phase compensated signal.

2. A rotation control device as claimed in claim 1, further comprising constant rotation detector means connected to the second phase comparator means for generating a constant rotation speed signal when the rotation of the motor is accelerated to a constant speed.

3. A rotation control device as claimed in claim 1, in which the second reference signal generator means comprises a divider for dividing a frequency of the first reference signal.

4. A rotation control device as claimed in claim 1, in which the operator means comprises means for combining the first and second difference signals by a predetermined ratio.

5. A rotation control device as claimed in claim 2, in which the operator means comprises means for combining the first and second difference signals by a predetermined ratio and means for varying said ratio in response to the constant rotation speed signal.

6. A rotation control device as claimed in claim 2, in which the operator means comprises means for selecting one of the first and second difference signals for said predetermined operation in response to the constant rotation speed signal.

* * * * *